United States Patent [19]

Sebenik

[11] Patent Number: 5,125,965
[45] Date of Patent: Jun. 30, 1992

[54] METHOD FOR MAINTAINING FLUIDIZATION IN A FLUIDIZED BED REACTOR

[75] Inventor: Roger F. Sebenik, Boulder, Colo.

[73] Assignee: Cyprus Minerals Company, Englewood, Colo.

[21] Appl. No.: 570,905

[22] Filed: Aug. 22, 1990

[51] Int. Cl.⁵ ............................................. C22B 5/14
[52] U.S. Cl. ........................................ 75/392; 75/623
[58] Field of Search ............... 75/623, 366, 444, 450, 75/451, 392

[56] References Cited

U.S. PATENT DOCUMENTS

| | | |
|---|---|---|
| 2,398,114 | 4/1946 | Rennie . |
| 2,783,187 | 2/1957 | Odell ................................ 196/52 |
| 3,264,098 | 8/1966 | Heytmeijer ........................ 75/623 |
| 3,311,466 | 3/1967 | Curlook ............................ 75/444 |
| 3,941,867 | 3/1976 | Wilkomirsky et al. ............ 423/53 |
| 4,045,216 | 8/1977 | Meyer et al. ...................... 75/623 |
| 4,659,376 | 4/1987 | Carpenter et al. ................ 75/623 |

FOREIGN PATENT DOCUMENTS 160508 12/1979 Japan ................................. 75/366

Primary Examiner—Melvyn J. Andrews
Attorney, Agent, or Firm—Sheridan, Ross & McIntosh

[57] ABSTRACT

A process for enhancing fluidization in a fluidized bed reactor chamber. In a preferred embodiment, molybdenum oxide is reduced to molybdenum metal in the fluidized bed. An oxidant is introduced into the fluidized bed during the reducing process in order to substantially prevent or reverse the agglomeration of the particles.

37 Claims, 2 Drawing Sheets

METHOD FOR MAINTAINING FLUIDIZATION IN A FLUIDIZED BED REACTOR

TECHNICAL FIELD OF THE INVENTION

This invention relates in general to the fluidized bed reduction of particulate compounds, and more particularly to a method for enhancing bed fluidization during reduction of molybdenum oxides.

BACKGROUND OF THE INVENTION

Metal oxides and compounds are frequently reduced to lower oxidation states in order to obtain a desired intermediate oxide or compound or the elemental metal itself. For example, molybdenum trioxide ($MoO_3$) can be reduced to molybdenum dioxide ($MoO_2$) or other intermediate oxides or molybdenum metal (Mo) by heating $MoO_3$ in the presence of a reducing gas.

U.S. Pat. No. 3,264,098 by Heytmeijer, issued Aug. 2, 1966, discloses a method for reducing molybdenum oxides to molybdenum in a fluidized bed. The reduction is accomplished in a stagewise manner using a reducing gas of a first temperature in a first stage and employing a reducing gas heated to a second temperature in a second stage. The reaction chamber must be vibrated in order to maintain the finely divided molybdenum compound in a fluidized state. One of the reasons given for stagewise reduction is to prevent the formation of coarse metal powder due to the presence of water vapor developed during the reaction.

U.S. Pat. No. 4,659,376 by Carpenter et al., issued Apr. 21, 1987, discloses the stagewise reduction of molybdenum oxide to molybdenum metal in a fluidized bed reactor. The process is said to reduce the content of impurities such as lead, zinc, bismuth and copper in the finished product. It is disclosed that mechanical stirring of the bed is required during the second stage. It is also disclosed that $MoO_3$ will sublime at temperatures above about 650° C., causing the bed to get sticky and eventually defluidize.

U.S. Pat. No. 2,398,114 by Rennie, issued Apr. 9, 1946, discloses a process for reducing granulated molybdenum trioxide to molybdenum dioxide and finally to molybdenum metal. In order to prevent the initial reduction of molybdenum trioxide to molybdenum dioxide from proceeding at too high a temperature, the reducing gas is diluted with a non-reducing gas. Examples of such diluting gases include steam and nitrogen. It is disclosed that a diluting gas is not necessary during the reduction of molybdenum dioxide to molybdenum metal. There is no disclosure of employing a fluidized bed reactor to accomplish the reduction.

U.S. Pat. No. 3,941,867 by Wilkomirsky et al., issued Mar. 2, 1976, discloses a process for oxidizing molybdenum disulfide ($MoS_2$) to molybdenum trioxide in a fluidized bed. Refractory particles such as sand, alumina and magnesia are used to stabilize and improve the fluidization behavior of the bed and to prevent agglomeration and/or sintering of solids in the reactor. Additionally, it is disclosed that a scraping device such as rotary arm blades or a vibratory device can be employed to prevent build-up of material inside the reactor.

In typical prior art methods for reducing a molybdenum oxide in a fluidized bed reactor chamber, finely ground molybdenum oxide is fed into the chamber and a fluidizing gas is injected from the bottom to cause the molybdenum oxide to fluidize. As used herein, the term "molybdenum oxide" refers in general to the molybdenum compound introduced into the reactor chamber. It will thus be understood to refer to all molybdenum oxides such as, for example, molybdenum trioxide ($MoO_3$), molybdenum dioxide ($MoO_2$) and molybdenum sesquioxide ($Mo_2O_3$). The chamber is heated and a reducing gas supplied. Because of the fluidized state of the molybdenum oxide particles, the reducing gas is able to surround each particle, thereby increasing the speed and completeness with which the reduction occurs.

Because molybdenum trioxide volatilizes at temperatures above approximately 650° C. and would be lost to the reactor chamber, it is common to use a two-stage method for reduction of molybdenum trioxide to metal. In stage one, molybdenum trioxide is reduced at a temperature below about 600° C. to produce molybdenum dioxide as follows:

$$MoO_3 + H_2 \rightarrow MoO_2 + H_2O + heat.$$

In stage two, molybdenum dioxide begins to reduce to molybdenum at approximately 760° C. as follows:

$$MoO_2 + 2H_2 + heat \rightarrow Mo + 2H_2O.$$

Reduced product is removed from the reactor chamber through an overflow discharge tube. If the product is molybdenum dioxide, the process is repeated a second time at a higher temperature and the final product, molybdenum metal, is discharged through the overflow tube.

Because the reducing gas must contact each molybdenum oxide particle in order for complete reduction to occur, it is important that the particles in the chamber remain in a fluidized state. This is particularly critical during the second stage reduction process in which the molybdenum metal particles tend to stick together (agglomerate) causing defluidization, thus stopping the process.

Past efforts to eliminate the problem of defluidization have included the use of mechanical stirrers within the reactor chamber and external vibratory devices to prevent particles from sticking together or to separate the particles which have stuck together. It would be advantageous to provide a nonmechanical means for maintaining or restoring bed fluidization in a fluidized bed reactor chamber.

SUMMARY OF THE INVENTION

In accordance with the present invention, a method is provided which substantially reduces the problem of particle stickiness and resulting bed defluidization during reduction of metal oxides and compounds in a fluidized bed reactor. While the invention is especially suited for use during the metallization of molybdenum oxide, the present method can also be performed during the fluidized bed reduction of other metal oxides or compounds in which particle agglomeration is a problem.

In a multiple stage continuous fluidized bed process for reduction of $MoO_3$ to molybdenum metal operated at steady state, the bed material for each stage is the product material of that stage. Thus, for stage one of molybdenum reduction, molybdenum trioxide is continuously introduced into an existing bed of molybdenum dioxide being fluidized by a fluidizing gas which contains at least a stoichiometric amount of reductant to react with the molybdenum trioxide feed to form molybdenum dioxide. For stage two, molybdenum dioxide is introduced into a bed of molybdenum metal particles also being fluidized by a fluidizing gas which contains at least a stoichiometric amount of reductant to react with the molybdenum dioxide feed to form molybdenum metal. Generally an excess amount of reductant is preferred to insure complete reaction (e.g., about 150% of the stoichiometric amount for stage one and about 300% to about 500% of the stoichiometric amount for stage two).

In a preferred embodiment of the present invention, molybdenum oxide particles are introduced into a fluidized bed reactor chamber containing a bed of already reduced particles, the particles are fluidized with a fluidizing gas, and are reduced with a reducing gas at a predetermined temperature or temperatures. In order to substantially reverse particle agglomeration and bed defluidization when it occurs, the reduced particles are selectively oxidized in the same chamber to provide them with a thin surface coating of molybdenum oxide. The oxide layer substantially reduces the metal to metal attraction which is thought to cause agglomeration. Because the particles do not stick together and form clumps, the bed recovers fluidization allowing the molybdenum oxide to be reduced and removed from the chamber as metal.

In the embodiment just described, existing agglomeration can be substantially reversed by oxidizing the reduced particles. In another embodiment, the same principal is used to continuously oxidize the reduced particles to substantially prevent agglomeration from occurring. As used herein, the term "enhancing" shall refer to both maintaining and recovering bed fluidization.

In one embodiment of the present invention, molybdenum trioxide is reduced in a two stage process to molybdenum. In the first stage, molybdenum trioxide is heated to a temperature between about 400° C. and about 650° C. and reduced to molybdenum dioxide. In the second stage, molybdenum dioxide is reduced at a temperature between about 760° C. and about 1040° C. In this second stage, it is essential that the reduced particles be oxidized to prevent stickiness and to maintain bed fluidization. The oxidation can be applied periodically as needed during the reduction process to refluidize the bed or it can be applied continuously to maintain fluidization.

To oxidize the molybdenum, in either stage one or stage two, an oxidant is provided in the fluidized bed reaction chamber while the molybdenum oxide is being reduced. Under ideal steady state conditions, it has been found that sufficient water forms during the reduction process to oxidize the reduced particles and either substantially prevent defluidization or substantially refluidize the bed when defluidization occurs. Thus, as long as molybdenum oxide continues to be introduced into the reactor chamber, water will continue to form and is available to oxidize the reduced molybdenum. However, ideal conditions rarely exist or can be maintained; thus existing fluidized bed reactor systems have relied upon mechanical means for maintaining/restoring bed fluidization. When ideal conditions cannot be maintained, therefore, the present invention includes the step of introducing an oxidant into the chamber. While the preferred oxidant is steam, other oxidants can also be employed.

In another embodiment, the molybdenum oxide is reduced, oxidized and then removed from the chamber with an underflow tube connected at the bottom of the chamber. Such an underflow discharge preferentially removes the larger reduced particles. With the large particles removed, it is easier to maintain fluidization of the reduced molybdenum particles.

In a preferred embodiment of the second stage reduction, the temperature of the chamber is kept below about 1040° C. in order to further reduce the chances of particle agglomeration and the resulting defluidization.

Thus, the method of the present invention provides the advantage of substantially reversing and/or reducing particle stickiness in a fluidized bed reactor chamber which heretofore has caused defluidization of the bed. This important advantage is obtained without resorting to mechanical means, such as stirring the particles or vibrating the reactor chamber.

DETAILED DESCRIPTION OF THE INVENTION

Figure 1:
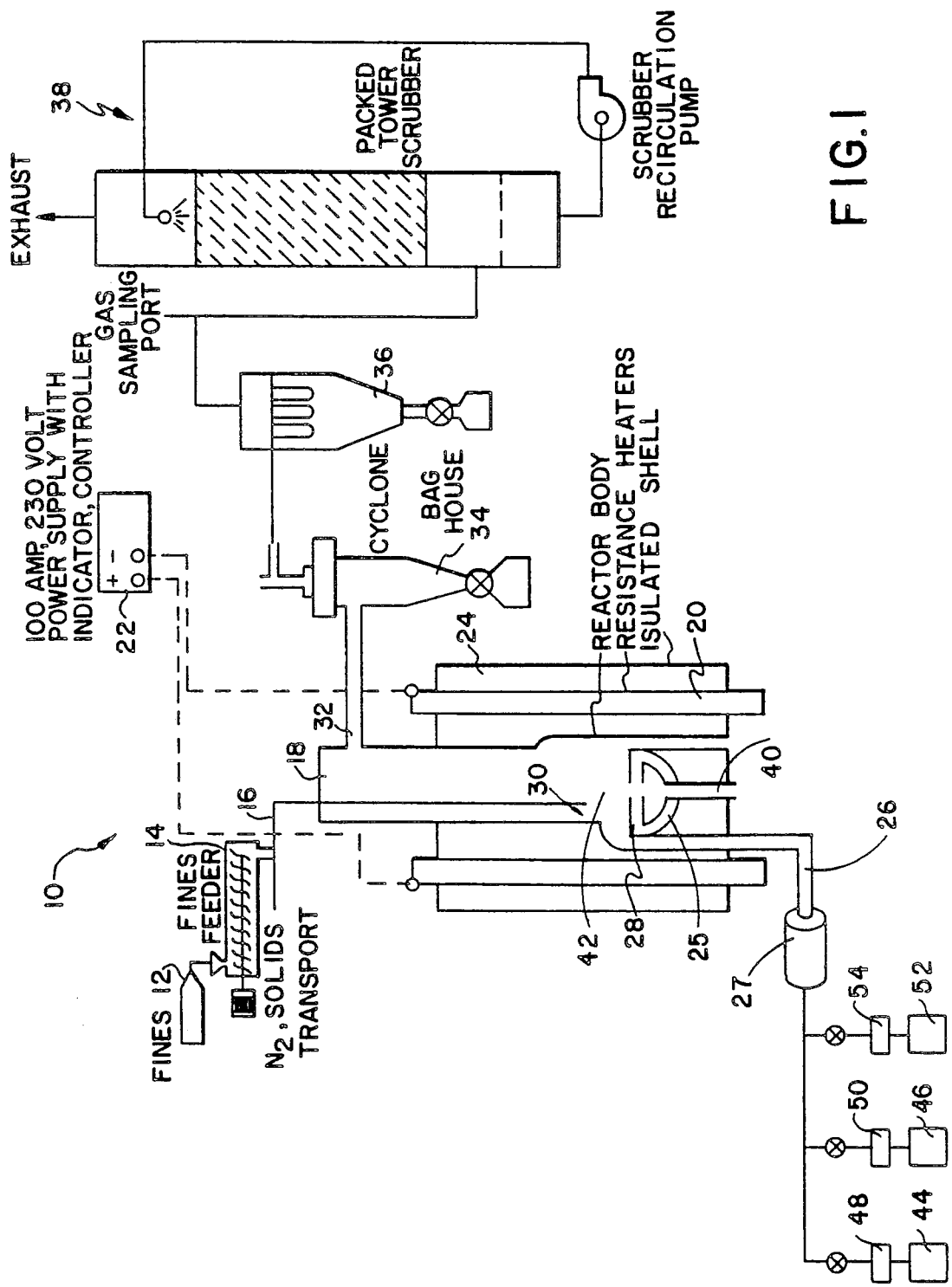
FIG. 1 illustrates a schematic representation of a fluidized bed reactor system of the present invention.

A preferred embodiment of the present invention is best understood by referring to FIG. 1, which is a schematic representation of a fluidized bed reactor system, generally indicated as 10. For ease of understanding, the process will be described primarily in terms of stage two, the reduction of molybdenum dioxide to molybdenum metal, although it will be understood that the process can also be employed during the reduction of molybdenum trioxide to molybdenum dioxide and during the reduction of other metal compounds (such as iron and tungsten compounds) to their respective metals.

Reduced molybdenum metal in the bottom of a reactor chamber 18 forms a bed, indicated generally as 30. Fluidization gas is introduced under steady state and continuous operation into the bottom of reactor chamber 18 through a fluidization gas tube 26 into a plenum or up entirely of the reducing gas. The reducing gas 44 can be any gas known in the art to reduce the relevant compounds in the reactor chamber. Dissociated ammonia is a preferred fluidization/reducing gas because of its lower cost, although other reductants can also be used. Examples of other suitable reducing gases include hydrogen, undissociated ammonia, various hydrocarbons such as methane and propane, manufactured gas such as "endogas", metallic vapors and mixtures thereof.

Molybdenum dioxide particles 12 are placed in a particle feeder 14 which feeds the particles 12 at a fixed rate into a feed tube 16. An inert transport gas, such as nitrogen, can be injected into feed tube 16 to help carry the feed 12 into the reactor chamber 18.

Various means may be used to heat the reactor chamber 18, such as a resistance heater 20 which surrounds reactor chamber 18 and is coupled to a power supply 22. Reactor chamber 18 and heater 20 are surrounded by an insulating shell 24 to reduce temperature fluctuations within reactor chamber 18.

The fluidization gas 46 flows through bed 30 which at steady-state is made up of reduced metal particles 42, causing the metal 42 to become fluidized. In such a fluidized state, stoichiometric amounts or excess amounts of reducing gas 44 are able to surround each particle and, at the appropriate temperature, reduce any new metal oxide particles 12 being feed to the reactor 30.

Process gas exits chamber 18 through an exhaust port 32 located near the top of chamber 18. Any molybdenum dioxide particles 12 or reduced metal particles which are entrained in the process gas can be preferentially removed by cyclone 34 and baghouse 36, both external to chamber 18. An internal filter (not shown in FIG. 1) can alternatively be used to remove entrained particles. Remaining process gas is scrubbed in a tower 38 and exhausted.

As molybdenum dioxide particles 12 are reduced in accordance with the present invention, they are preferably removed from the bottom of the reaction chamber 18 through an underflow bed removal tube 40. It is an important advantage of the present invention to remove the reduced particles at distribution plate 28 because larger particles which can cause defluidization are preferentially removed first. The height of fluidized bed 30 is maintained at a relatively constant level.

The temperatures for the most efficient reduction are of importance, as the reduction rate is a function of the temperature. For best results, it is important that the compound being reduced be non-volatile at the temperature employed. Additionally, the effect of the selected temperature on equipment maintenance, physical state of the metal powder product and power cost factors should also be considered. The stage two temperature is typically between about 760° C. and about 1040° C., preferably between about 900° C. and about 1040° C. and more preferably about 980° C. and about 1040° C.

During stage one of molybdenum oxide reduction, the molybdenum trioxide solids 12 are fed into chamber 18 containing an initial bed 30 of molybdenum dioxide. The chamber may be the same chamber 18 used for the stage two reduction or may be a second chamber. If two reactor systems are used in sequence, both systems will be generally similar and, consequently, reference numbers in FIG. 1 are equally applicable to both stages. The bed is fluidized with a fluidization gas 46 which, as in stage two, can also be a reducing gas 44, preferably dissociated ammonia. The particles are reduced at a temperature between about 400° C. and about 650° C. and are removed through an underflow tube 40. Because molybdenum trioxide begins to volatize at about 650° C., it is advantageous for the temperature to remain below 650° C. Preferably, the stage one temperature is between about 550° C. and about 650° C., and more preferably between about 575° C. and about 625° C.

Defluidization of bed 30 may occur during stage one and stage two of a typical molybdenum oxide reduction process, but tends to occur more often during stage two. While not wishing to be bound by any theory, it is believed that the defluidization is caused by the metal-metal attraction of the reduced molybdenum metal particles which cause agglomeration. It is also believed that exothermic hot spots may form in bed 30 during stage one reduction and can cause some molybdenum dioxide (formed from reducing molybdenum trioxide) to be reduced to molybdenum metal. Attraction between such molybdenum metal particles may, therefore, cause agglomeration and defluidization during stage one. Because molybdenum metal is the product of stage two, it is believed that the greater number of metal particles increases the metal-metal attraction and resulting agglomeration and defluidization. Prior practice has been to employ mechanical stirrers or vibrators in order to keep the metal particles separated and thereby maintaining fluidization.

In order to enhance bed fluidization (that is, in order to reverse or prevent defluidization), it has unexpectedly been found that the use of an oxidant in the reactor chamber 18 will substantially recover or maintain proper fluidization. Examples of suitable oxidants include oxygen, air, peroxide compounds, carbon dioxide, carbon monoxide and, preferably, water (in the form of steam). Mixtures of these gases can also be employed. While not wishing to be bound by any theory, it is believed that the oxidant causes a partial reversal of the reduction reaction and leads to the formation of a layer of $MoO_2$ molecules on the surface of the reduced molybdenum metal particles thereby substantially reducing the metal-metal attraction.

In one embodiment of the present invention, the oxidant is the water formed when molybdenum dioxide fed to a stage two bed of molybdenum metal is reduced to molybdenum metal. Thus, as long as sufficient amounts of molybdenum dioxide continue to be reduced and give off water, a back reaction can continue to occur in which the resulting molybdenum metal is partially oxidized and thus stickiness is prevented and fluidization can be maintained. It is important to note that for this to occur, molybdenum dioxide must continue to be introduced into reactor chamber 18 in the presence of a reducing gas.

Preferably, from about 2 to about 8 weight percent steam is added to the system. The oxidant may be added continuously during the reduction process to substantially prevent defluidization or may be added when defluidization occurs for as long as necessary to refluidize the bed as indicated by chamber pressure differential measurements. The amount of oxidant added can be determined by stoichiometrically calculating the equivalent amount of water vapor necessary to refluidize the bed.

As previously disclosed, while defluidization occurs more often during stage two, it can also occur during stage one. Therefore, the present invention includes the step of using an oxidant during stage one. The oxidant may be the water formed during reduction of molybdenum trioxide to molybdenum dioxide or may be an external oxidant introduced into chamber 18, continuously or as needed.

Figure 2:
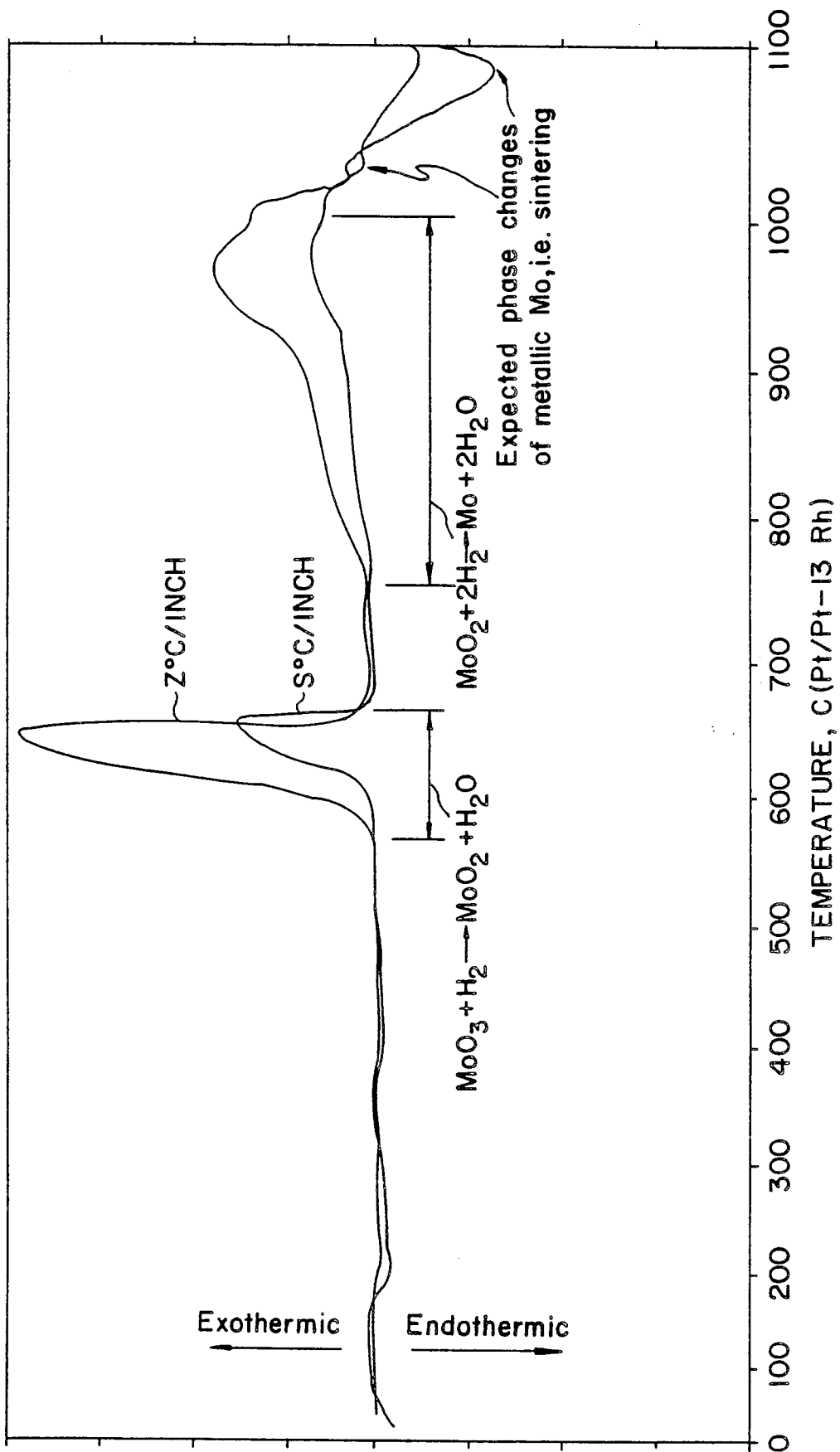
FIG. 2 is a graphical representation of a differential thermal analysis performed during the reduction of molybdenum oxide.
Figure 1:
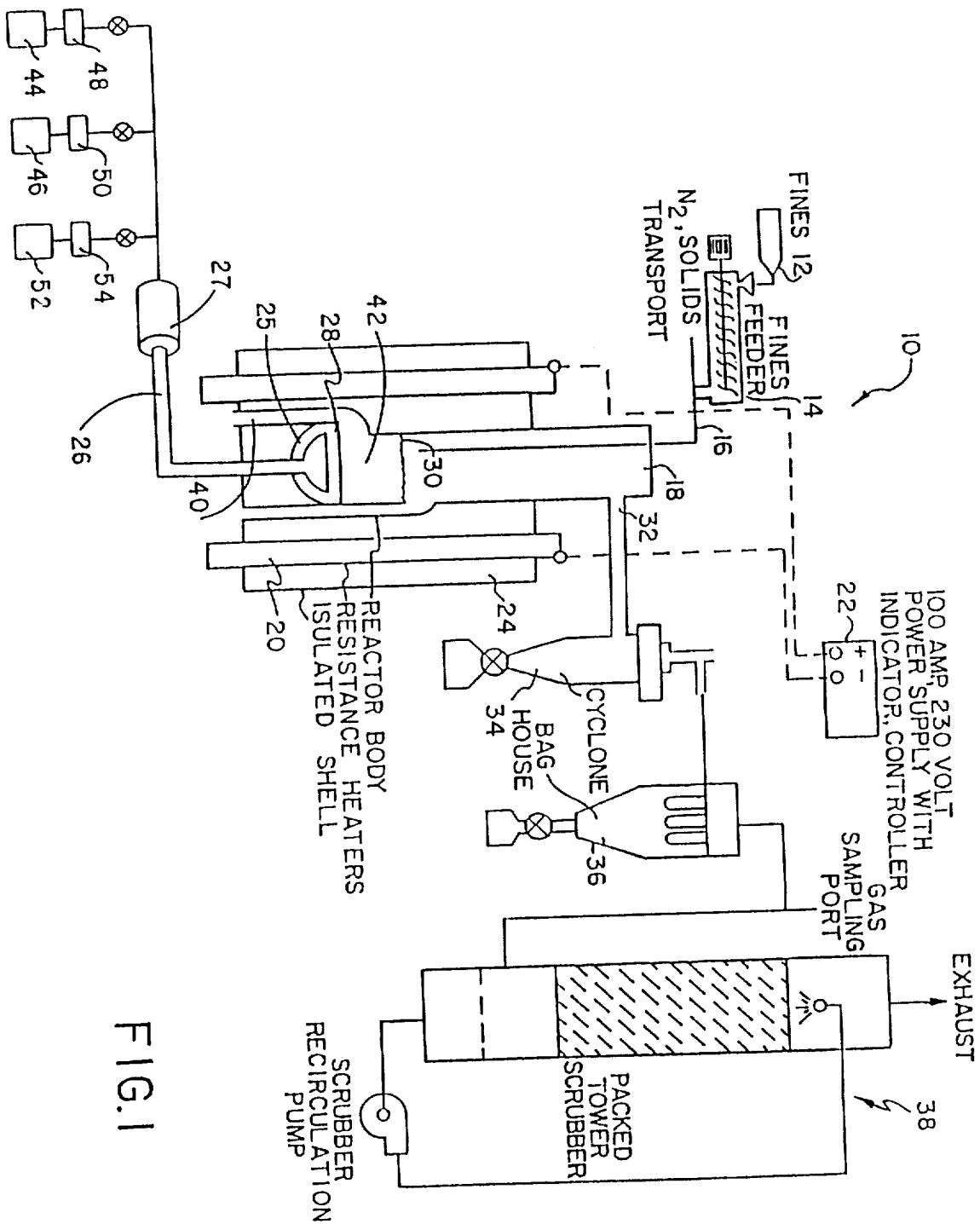
Figure 2:
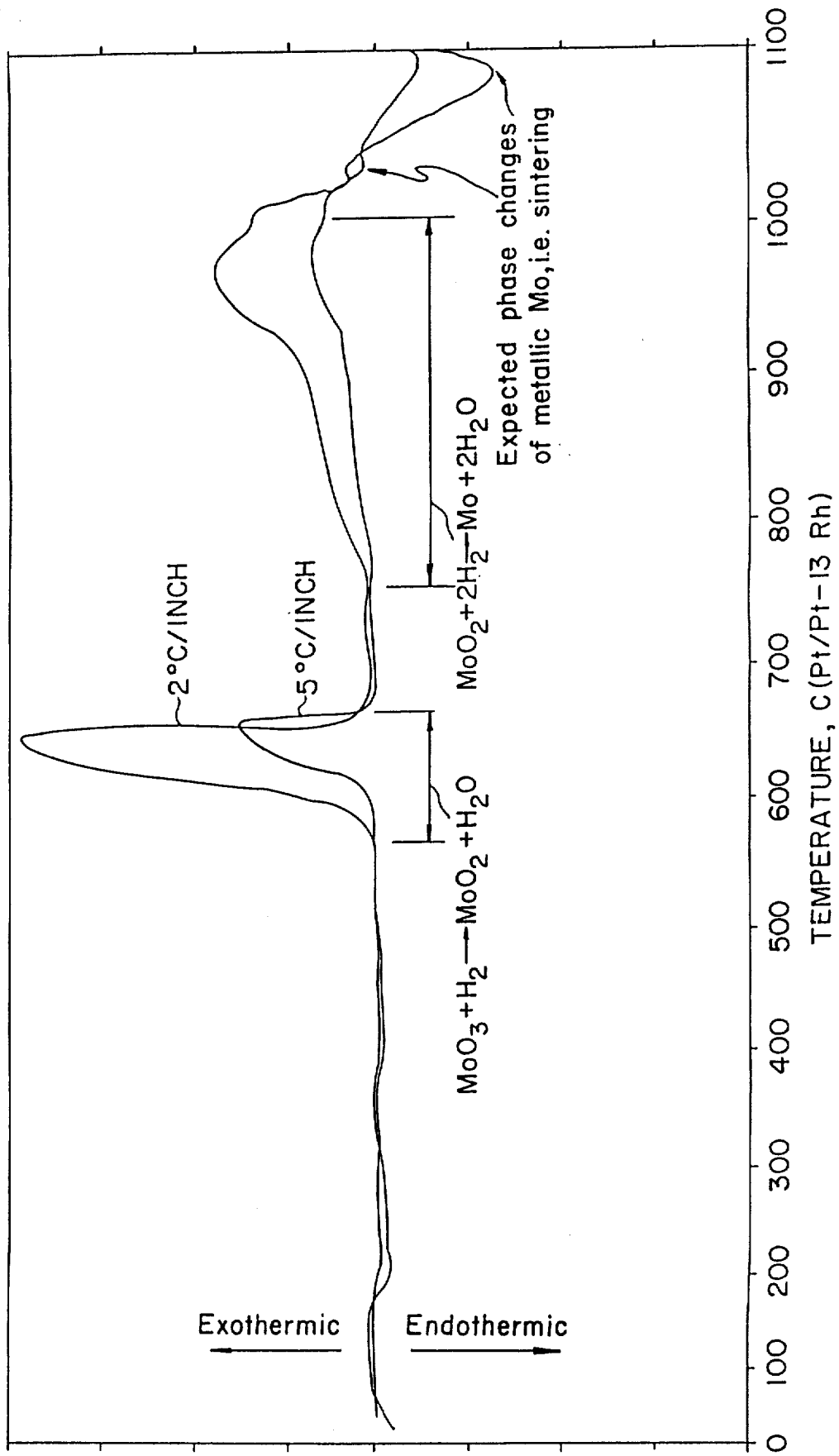
Figure 1:
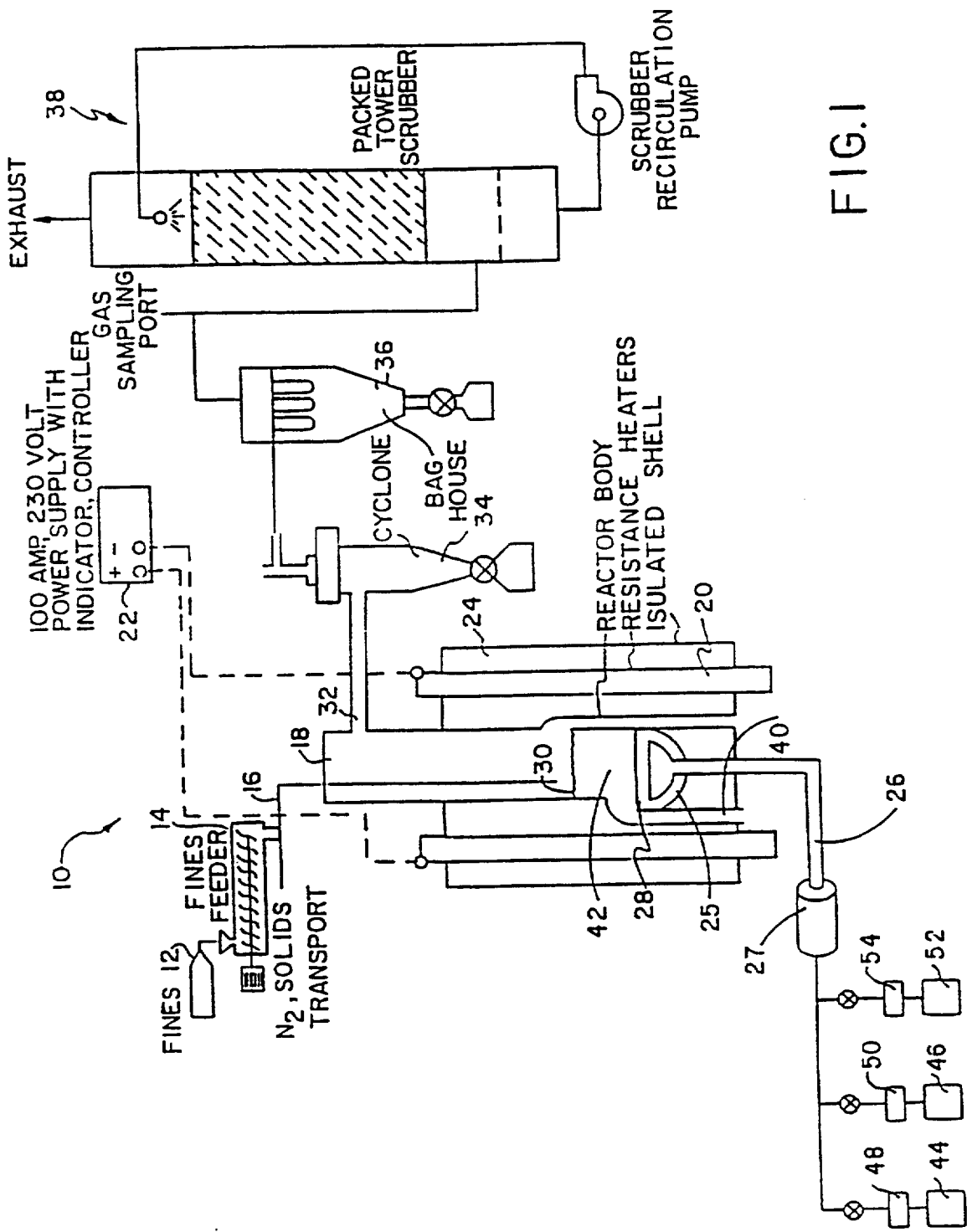
Figure 2:
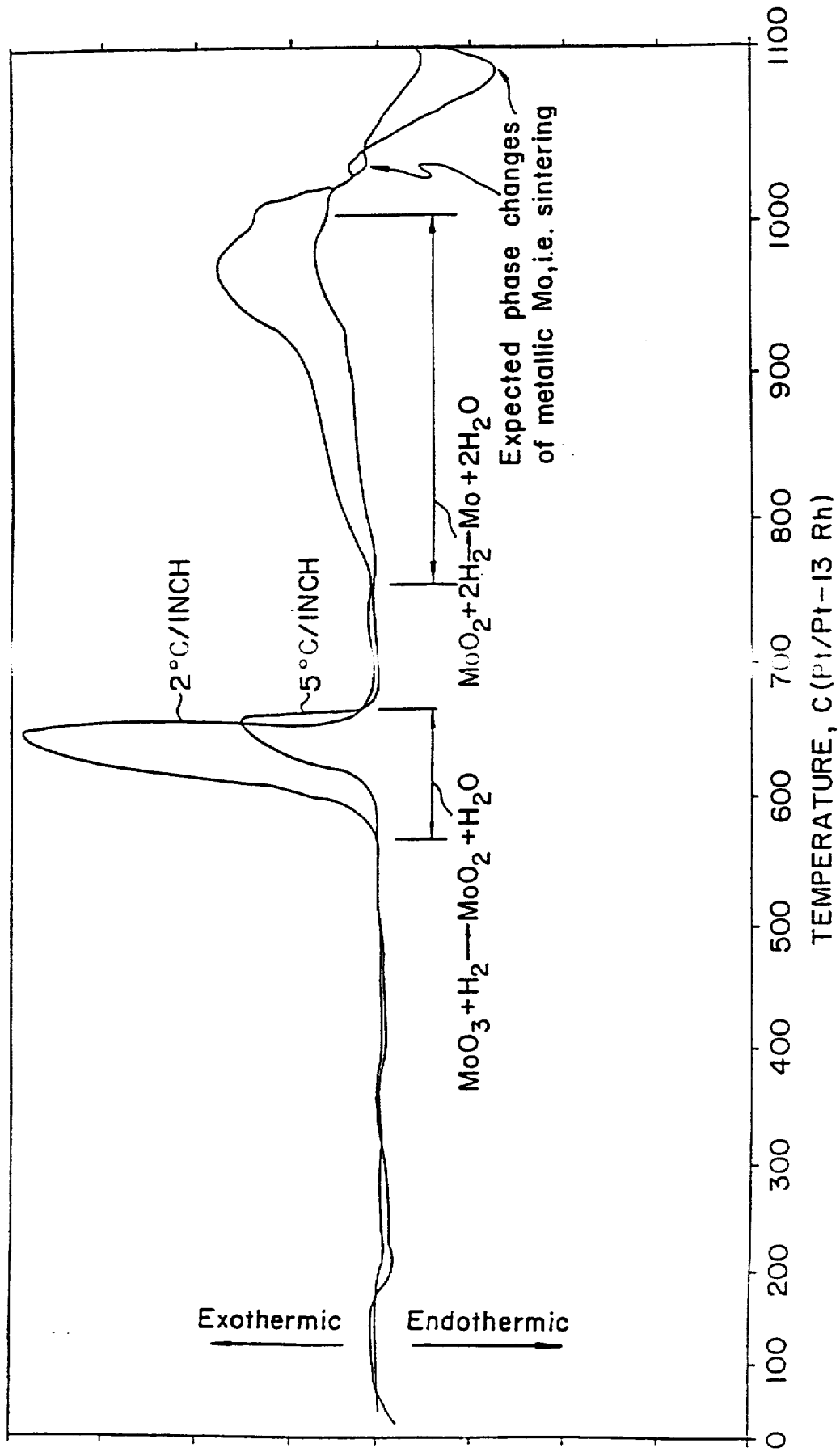

It is important to maintain the temperature in stage two below 1040° C. because it is believed that a phase transition occurs near this temperature which can lead to particle agglomeration and bed defluidization. Such a transition is illustrated in FIG. 2, which is a graphic representation of a differential thermal analysis performed during the two stages of molybdenum oxide reduction. Differential thermal analysis detects temperature differences between a sample and a nonreactive reference material, in this case alumina ($Al_2O_3$), when heated in tandem under a programmed rate of heating. The temperature differences are recorded as endothermic reactions, which require heat, or exothermic reactions, which release heat. Differential thermal analysis can measure temperatures of phase transitions, melting points, volatilizations, oxidations and dehydrations.

The differential thermal analysis illustrated in FIG. 2 shows a highly exothermic reaction beginning at about 570° C. and peaking at about 650° C. representing the reduction of molybdenum trioxide to molybdenum dioxide. A second exotherm appears to begin at about 760° C., with major changes occurring starting at about 922° C. An endotherm beginning at about 1040° C. suggests a phase change of the metallic molybdenum metal, which may be caused by the onset of sintering which, in turn, could defluidize the bed. Therefore, stage two of the present invention of molybdenum oxide reduction process is preferably carried out at a temperature slightly less than 1040° C.

In accordance with another preferred aspect of the present invention, the reduced particles from stage one and stage two are removed from the reactor chamber 18 through an underflow port 40 located near the bottom of the reactor chamber 18. In this manner, any agglomerated particles are preferentially removed, thus helping maintain fluidization of the fluidized bed 30.

The following examples illustrate preferred embodiments of the process of the present invention.

EXAMPLE I

Stage one: 10 cm diameter fluidized bed with a bed of 2 kg $MoO_2$
$MoO_3$: 21.72 kg screened at −10 mesh
Feed rate: 1.8 kg/hr
Bed temperature: 600° C.
Reducing gas: $H_2$ at 0.87 standard cubic meters per hour (scmh)
Inert Fluidizing gas: $N_2$ at 0.8 scmh Of the initial 21.72 kg of molybdenum trioxide, products totaling 18.894 kg (approximately 98%) were recovered.

Stage two: 10 cm diameter fluid bed with a bed of 2 kg Mo
$MoO_2$: 2 kg from stage one, screened at −10 mesh
Feed rate: 0.6 kg/hr
Bed temperature: 980° C.
Reducing gas: $H_2$ at 0.76 scmh
Inert Fluidizing gas: $N_2$ at 0.85 scmh The stage two reactor was preheated using a nitrogen purge prior to introducing the bed material. Water vapor was added at a rate of 0.5 $cm^3$/min in the fluidizing gas to maintain proper fluidization of the bed when the $MoO_2$ feed was off or when a decrease in the bed pressure indicated signs of stickiness. Added water vapor and steam generated by the reduction was maintained at approximately 5 weight percent until fluidization recovered. Thus, particle stickiness was substantially avoided and the bed remained fluidized at all times.

EXAMPLE II

The following example illustrates how attempts to refluidize a bed were unsuccessful when $N_2$ and $NH_3$ gases were employed, and how the bed was successfully refluidized when an amount of oxidant (i.e. $H_2O$) was added. The conditions were as follows:
Stage two: Reduction of $MoO_2$ to Mo
Reactor: 36 cm diameter fluidized bed
Bed: Approximately 113 kg Mo
$MoO_2$ feed rate: 20.4 kg/hour
Bed temperature: 980° C.
Discharge rate: 15.4 kg/hour
Bed differential pressure: 87.2 cm water column (WC)
Fluidizing/reducing gas: $NH_3$ at 24 scmh During a stage two test under the above conditions, the reactor furnace transformer broke down causing a temperature drop in the reactor. The $NH_3$ flow was replaced with an inert fluidizing gas, $N_2$, at approximately 8.5 scmh. Bed fluidization was lost. Increasing the $N_2$ flow to 36.8 scmh did not cause fluidization to return. Nor did a return to $NH_3$ fluidizing/reducing gas at 24 scmh. The bed differential pressure was approximately 12.8 cm WC.

The $NH_3$ was again replaced, this time with a combination of $N_2$ at 22.7 scmh and steam at approximately 0.7 kg/hour (approximately 2.5 weight percent).

After approximately thirty minutes, the bed differential pressure increased to 64 cm WC and, after approximately forty-five minutes, the bed differential pressure increased to 90 cm WC indicating fluidization was regained. The steam feed was then discontinued.

Although the present invention has been described in detail, it should be understood the various changes, substitutions and alterations can be made herein without departing from the scope and spirit of the invention as defined by the appended claims.

What is claimed is:
1. A method for enhancing fluidization in a fluidized bed reactor chamber comprising the steps of:
   introducing metal oxide particles into a fluidized bed reactor chamber;
   reducing said metal oxide particles; and
   introducing an oxidant into the chamber to enhance the fluidization of the reduced particles while the reduced particles are in the chamber.
2. The method of claim 1 wherein said metal oxide comprises molybdenum oxide.
3. The method of claim 1 wherein said metal oxide is selected from the group consisting of molybdenum trioxide, molybdenum dioxide, molybdenum sesquioxide, oxides of iron and oxides of tungsten.
4. The method of claim 1 wherein said metal oxide comprises molybdenum trioxide and said molybdenum oxide is reduced to metallic molybdenum in a stagewise manner, said method comprising the steps of:
   reducing molybdenum trioxide to molybdenum dioxide in a first stage at a temperature within the range of about 400° C. to about 650° C.; and
   reducing molybdenum dioxide to molybdenum metal in a second stage at a temperature within the range of about 760° C. to about 1040° C.
5. The method of claim 4 wherein said step of introducing an oxidant includes the step of:
   continually introducing an oxidant into said second stage in order to reoxidize a portion of the metallic molybdenum and substantially prevent the metallic molybdenum particles from sticking together to a degree that would prevent the particles from remaining fluidized.
6. The method of claim 4 wherein said step of introducing an oxidant further includes the step of:
   continually introducing an oxidant into said first stage in order to substantially prevent reduced particles from sticking to each other to a degree that would prevent the particles from remaining fluidized.
7. The method of claim 4 wherein said step of introducing an oxidant includes the step of:
   introducing an oxidant into said second stage when the bed defluidizes in order to oxidize metallic molybdenum particles and substantially separate agglomerated metallic molybdenum particles such that the bed is substantially refluidized.
8. The method of claim 4 wherein said step of introducing an oxidant includes the step of:
   introducing an oxidant into said first stage when the bed defluidizes in order to oxidize molybdenum particles and substantially separate agglomerated molybdenum particles such that the bed is substantially refluidized.

9. The method of claim 2 wherein said step of introducing an oxidant comprises introducing sufficient additional molybdenum oxide into the chamber under reducing conditions to generate $H_2O$ whereby the bed is fluidized.

10. The method of claim 1 wherein said oxidizing step comprises the step of introducing an oxidant selected from the group consisting of oxygen, air, water, peroxide compounds, carbon dioxide, carbon monoxide, and mixtures thereof.

11. A method for reducing molybdenum oxide, comprising the steps of:
introducing molybdenum oxide particles into a fluidized bed reactor chamber;
reducing the molybdenum oxide particles; and
at least partially oxidizing the reduced particles to enhance the fluidization of the reduced particles while the reduced particles are in the chamber.

12. The method of claim 11 wherein said oxidizing step comprises the step of continually introducing an effective amount of an oxidant into the chamber to substantially maintain bed fluidization.

13. The method of claim 11 wherein said oxidizing step comprises the step of introducing an effective amount of an oxidant into the chamber when the bed defluidizes to substantially refluidize the bed.

14. The method of claim 11 wherein said oxidizing step comprises introducing an oxidant into the chamber under reducing conditions.

15. The method of claim 11 wherein said oxidizing step comprises introducing an oxidant into the chamber under neutral conditions.

16. The method of claim 11 wherein said oxidizing step comprises introducing additional molybdenum oxide under reducing conditions to generate $H_2O$ whereby the bed is fluidized.

17. The method of claim 11 wherein said introducing step comprises introducing $MoO_3$ into the fluidized bed reactor chamber.

18. The method of claim 17 wherein said reducing step comprises reducing $MoO_3$ to $MoO_2$ at a temperature within the range of about 400° C. to about 650 ° C.

19. The method of claim 17 wherein said reducing step comprises reducing $MoO_3$ to $MoO_2$ at a temperature within the range of about 550° C. to about 650° C.

20. The method of claim 17 wherein said reducing step comprises reducing $MoO_3$ to $MoO_2$ at a temperature within the range of about 575° C. and about 625° C.

21. The method of claim 11 wherein said introducing step comprises introducing $MoO_2$ into the fluidized bed reactor chamber containing molybdenum metal particles.

22. The method of claim 21 wherein said reducing step comprises reducing $MoO_2$ to Mo at a temperature within the range of about 760° C. to about 1040° C.

23. The method of claim 21 wherein said reducing step comprises reducing $MoO_2$ to Mo at a temperature within the range of about 900° C. to about 1040° C.

24. The method of claim 21 wherein said reducing step comprises reducing $MoO_2$ to Mo at a temperature within the range of about 980° C. to about 1040° C.

25. The method of claim 11 further comprising the step of:
discharging reduced product from the reactor chamber through an underflow port located at the bottom of the reactor chamber.

26. The method of claim 12 wherein said step of introducing an oxidant comprises the step of introducing an oxidant selected from the group consisting of oxygen, air, water, peroxide compounds, carbon dioxide, carbon monoxide, and mixtures thereof.

27. The method of claim 13 wherein said step of introducing an oxidant comprises the step of introducing an oxidant selected from the group consisting of oxygen, air, water, peroxide compounds, carbon dioxide, carbon monoxide, and mixtures thereof.

28. The method of claim 11 wherein said reducing step comprises the step of reducing the molybdenum oxide with a reducing agent selected from the group consisting of hydrogen, dissociated ammonia, undissociated ammonia, methane, propane, a manufactured reducing gas, and mixtures thereof.

29. A method for reducing $MoO_3$ to Mo, comprising the steps of:
introducing $MoO_3$ into a first fluidized bed reactor chamber containing $MoO_2$ particles;
reducing $MoO_3$ to $MoO_2$ at a first temperature;
introducing $MoO_2$ into a second fluidized bed reactor chamber containing metallic molybdenum particles;
reducing $MoO_2$ to Mo particles at a second temperature; and
oxidizing Mo particles to substantially prevent said particles from sticking to each other.

30. The method of claim 29 wherein said step of oxidizing Mo comprises introducing an oxidant into the chamber under reducing conditions.

31. The method of claim 29 wherein said step of oxidizing Mo comprises introducing an oxidant into the chamber under neutral conditions.

32. The method of claim 29 wherein said oxidizing step comprises the step of introducing an oxidant selected from the group consisting of oxygen, air, water, peroxide compounds, carbon dioxide, carbon monoxide, and mixtures thereof.

33. The method of claim 29 wherein said step of oxidizing Mo comprises introducing additional $MoO_2$ under reducing conditions to generate $H_2O$ whereby the bed is fluidized.

34. The method of claim 29 wherein the first temperature is within the range of about 400° C. to about 650° C.

35. The method of claim 29 wherein the second temperature is within the range of about 760° C. to about 1040° C.

36. The method of claim 29 and further comprising the step of:
discharging each of the first and second reactor chambers through an underflow port located at the bottom of the reactor chambers.

37. The method of claim 29 further comprising the step of:
oxidizing particles in said first fluidized bed reactor chamber to substantially prevent the particles from sticking to each other.

* * * * *

UNITED STATES PATENT AND TRADEMARK OFFICE
CERTIFICATE OF CORRECTION

PATENT NO. : 5,125,965

DATED : June 30, 1992

INVENTOR(S) : Sebenik et al

Page 1 of 3

It is certified that error appears in the above-indentified patent and that said Letters Patent is hereby corrected as shown below:

On the title page: Item [75]: Inventors,
please add "Rodney G. Hodgson, Arvada, Colo." along with Roger F. Sebenik Under the heading "United States Patent" on the front page of the patent, please change "Sebenik" to
--Sebenik et al.--

The sheets of drawing consisting of Fig. 1 &2 shoul be deleted and be replaced with the attached sheets Signed and Sealed this Thirteenth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,125,965  
DATED : June 30, 1992  
INVENTOR(S) : Sebenik et al

Page 1 of 3

It is certified that error appears in the above-indentified patent and that said Letters Patent is hereby corrected as shown below:

On the title page, item [75] Inventors: insert the following "Rodney G. Hodgson, Arvada, Colo." along with Roger F. Sebenik.

item [19]: "Sebenik" should read --Sebenik et al--.

The sheets of drawing consisting of Figs. 1&2 should be deleted and replaced with the attached pages.

This certificate supersedes Certificates of Correction issued July 13, 1993.

Signed and Sealed this

Fourth Day of April, 1995

Attest:

BRUCE LEHMAN

*Attesting Officer*    *Commissioner of Patents and Trademarks*